United States Patent [19]
Holka

[11] Patent Number: 5,588,482
[45] Date of Patent: Dec. 31, 1996

[54] DUCTED COOLING SYSTEM FOR AN AUTOMOTIVE VEHICLE

[75] Inventor: Thomas C. Holka, Milford, Mich.

[73] Assignee: Ford Motor Company, Dearborn, Mich.

[21] Appl. No.: 311,975

[22] Filed: Sep. 26, 1994

[51] Int. Cl.⁶ .................. F28D 7/16; F01P 7/02; F01P 11/10; B60K 11/08
[52] U.S. Cl. .................. 165/44; 165/41; 165/51; 165/122; 165/127; 180/68.1; 180/68.4; 123/41.49
[58] Field of Search ................. 165/122, 41, 44, 165/51, 126, 127, 903; 123/41.49, 41.48; 180/68.1, 68.4

[56] References Cited

U.S. PATENT DOCUMENTS

| | | | |
|---|---|---|---|
| 1,820,091 | 8/1931 | Reavis . | |
| 1,966,787 | 7/1934 | Buri | 123/41.49 |
| 2,503,667 | 4/1950 | Hagen | 165/127 |
| 2,586,689 | 2/1952 | Mieras et al. . | |
| 2,707,079 | 4/1955 | Little et al. . | |
| 2,783,978 | 5/1957 | Baumgarten . | |
| 2,808,237 | 10/1957 | Fosnes | 165/903 |
| 3,194,307 | 7/1965 | Wood . | |
| 3,752,226 | 8/1973 | Bullock | 165/126 |
| 4,519,343 | 5/1985 | Hayashi et al. | 123/41.49 |
| 4,699,208 | 10/1987 | Wolf et al. . | |
| 4,821,796 | 4/1989 | Schulz | 180/68.4 |
| 4,979,584 | 12/1990 | Charles | 180/68.4 |
| 5,046,554 | 9/1991 | Iwasaki et al. | 165/127 |
| 5,181,554 | 1/1993 | Mita . | |

FOREIGN PATENT DOCUMENTS

| | | | |
|---|---|---|---|
| 834352 | 4/1940 | France . | |
| 1138809 | 6/1957 | France | 165/127 |
| 2657825 | 8/1991 | France | 180/68.4 |
| 2903764 | 9/1980 | Germany | 123/41.49 |
| 3407746 | 9/1985 | Germany | 123/41.49 |
| 1236524 | 6/1971 | United Kingdom | 123/41.49 |
| 1436697 | 5/1976 | United Kingdom . | |

Primary Examiner—John K. Ford
Attorney, Agent, or Firm—Raymond L. Coppiellie

[57] ABSTRACT

A duct apparatus for drawing a flow of air into a heat exchanger assembly of an automotive vehicle and directing the flow of air exiting the heat exchanger assembly away from the vehicle engine is disclosed. The apparatus includes a generally rectangular body extending across the entire length of the heat exchanger assembly and partially enclosing it. The apparatus further includes a plurality of vanes disposed in the body adjacent the heat exchanger assembly, the vanes directing the flow of air exiting therefrom, a pair of generally curvilinear plenums each in fluid communication with the body and extending longitudinally therefrom. Each of the plenums includes an exit end for directing air exiting therefrom to ambient air and a fan assembly for drawing air through the heat exchanger assembly.

3 Claims, 2 Drawing Sheets

DUCTED COOLING SYSTEM FOR AN AUTOMOTIVE VEHICLE

BACKGROUND OF THE INVENTION

1. Field of the Invention

The present invention relates generally to a cooling system for an automotive vehicle. More particularly, the present invention relates to a ducted cooling system which draws air into the vehicle cooling system while the vehicle is stationary.

2. Disclosure Information

In a conventional radiator cooling system for an automotive vehicle, a fan is attached to a fan hub of the engine by means of bolts and is driven by the engine. A powerful air flow is produced by the fan and the air flow passes through the core of the radiator, along a direction from the fan to the core or from the core to the fan, depending upon the type of the fan. A fan shroud is usually mounted around the periphery of a fan in order to guide and promote the air flow produced by the fan.

Since the conventional fan is open to the atmosphere, noise is emitted by the fan. The fan shroud is intended to reduce the noise, but is not very effective. Furthermore, the conventional fan has a disadvantage in that it leads to an enlargement of the total length of the engine, because the fan is situated at the distal end of the engine. In particular, when the engine is mounted on a front wheel drive car, the total length of the engine becomes an issue.

Furthermore, with the advent of "cab forward" designs, the engine compartment space is decreased. While the vehicle is idling and stationary, the fan typically draws air through the radiator and this exiting air impinges directly upon the engine in the engine compartment of the vehicle. In the cab forward designs of the vehicle, this engine compartment temperature often rises to a critical temperature very quickly, necessitating means for providing cooling of the engine while the vehicle sits idling.

U.S. Pat. No. 5,181,554 discloses a cooling system for a vehicle wherein the existing fan of the vehicle is removed and an air suction duct is substituted for the fan. This duct is disposed adjacent to core of the radiator and a blower is connected to the suction duct to either draw air through or blow air through the radiator core. However, this duct is situated behind the radiator and is not efficient because of the open space between the radiator core and this duct. Furthermore, this duct does not reduce the engine compartment temperature by removing any of the air surrounding the engine while the vehicle is stationary. Therefore, it would be advantageous to provide a cooling system which reduces fan noise as well as decreases engine compartment temperature.

SUMMARY OF THE INVENTION

The present invention provides a duct apparatus for drawing a flow of air into a heat exchanger assembly of an automotive vehicle and directing the flow of air exiting the heat exchanger assembly away from the vehicle engine. The apparatus comprises a generally rectangular body extending across substantially the entire length of the heat exchanger assembly, the body partially enclosing the heat exchanger assembly. The apparatus further includes a plurality of "vanes" disposed in the body adjacent the heat exchanger assembly, the vanes directing the flow of air exiting the heat exchanger assembly to a pair of generally curvilinear plenums. Each of these plenums is in fluid communication with the body and includes an exit end for directing air exiting therefrom to ambient air. The duct apparatus further includes a fan assembly disposed in each of the plenums for drawing air through the heat exchanger assembly, the body and the pair of plenums while the vehicle is stationary.

It is an advantage of the present invention to provide for quiet, efficient cooling of the vehicle and to decrease the engine compartment temperature of the vehicle. These and other features, objects and advantages of the present invention will become apparent from the drawings, detailed description and claims which follow.

DETAILED DESCRIPTION OF THE PREFERRED EMBODIMENTS

Figure 1:
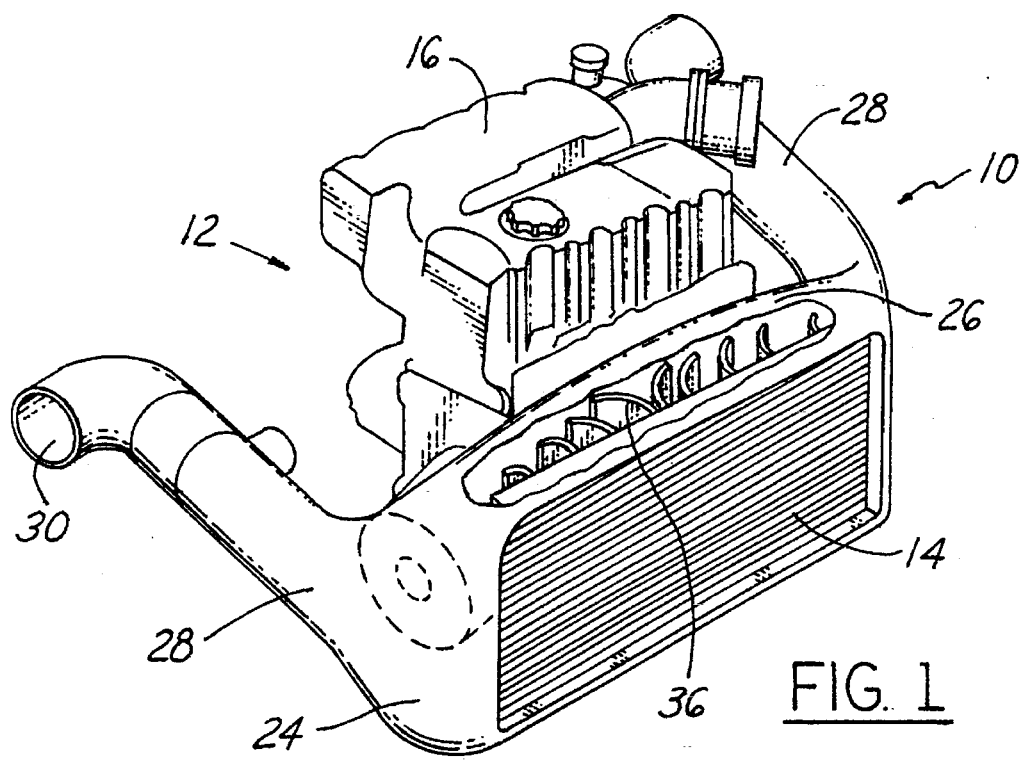
FIG. 1 is a perspective view of the ducted cooling system of the present invention.

Referring now to the drawings, FIG. 1 shows a ducted cooling system 10 according to the present invention disposed in an engine compartment 12 of an automotive vehicle. The system 10 includes a heat exchanger assembly 14, typically comprising a radiator and/or condenser fluidly connected in a known manner to the vehicle engine 16. The radiator 14 includes a front face 18 through which RAM air passes (see arrow A) as the vehicle is traveling, a rear face on an opposite side thereof and two generally vertical side edges 22.

According to the present invention, the ducted cooling system further includes a cooling duct 24 having a generally rectangular body 26 extending across substantially the entire length of the radiator 14. The body 26 is sealably connected to the vertical side edges 22 of the radiator 14 to partially enclose the radiator. By sealably enclosing the radiator 14, a greater efficiency of air flow through the radiator and into the ducted cooling system is achieved. Body 26 may also include a small bleed port 27 to allow some RAM air to pass therethrough while the vehicle is traveling if it is determined that some RAM air is needed to cool the vehicle.

The cooling duct 24 further includes a pair of generally curvilinear plenums 28 attached at the outboard edges of the body 26. The plenums 28 are generally cylindrical, hollow tubes which extend longitudinally from the body along the outboard edges of the engine 16. In the preferred embodiment, the plenums 28 are integrally formed with the body 26 from a synthetic polymeric material such as ABS or glass-filled nylon. This is due to the high temperature conditions within the interior of the engine compartment. The plenums 28 further include an exit end 30 through which the air flow passing through the radiator exits to ambient air. In this manner, the air flow entering the radiator is directed to each of the plenums extending longitudinally from the body 26 and directed to ambient air out through exit end 30.

When the vehicle is stationary, however, the RAM air does not exist and there is no flow of air through the cooling duct. This causes the temperatures within the engine compartment to rise substantially, necessitating the need for air to pass through the radiator to cool the engine of the vehicle.

To accomplish this, an electric motor driven fan 34 is placed within each of the hollow plenums 28 at a point substantially downstream from the generally rectangular body 26 of the cooling duct 24. When the vehicle is stationary, the fan assemblies 34 are turned on drawing ambient air through the radiator 14 to increase the cooling efficiency of the radiator to cool the engine. While the vehicle is moving, the fan 34 may or may not be utilized depending upon temperature readings within the radiator. For example, a temperature sensor could be placed on the radiator or in the engine compartment such that when the temperature exceeds a predetermined threshold, the fans 34 would turn on increasing the flow of air through the radiator to increase the cooling to the engine.

Figure 3A:
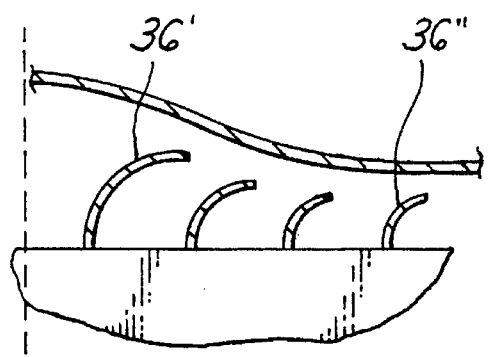
FIGS. 3A and 3B are top plan views of two different embodiments of vanes used in the apparatus of the present invention.
Figure 3B:
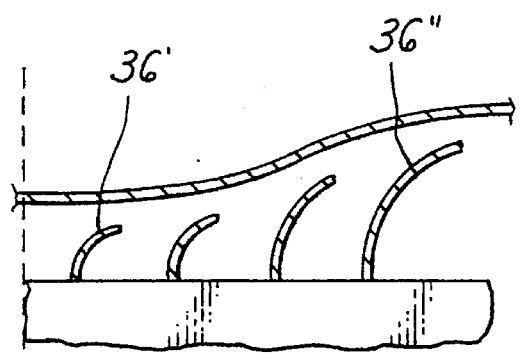

The cooling duct 24 of the present invention further includes a plurality of vanes 36 disposed within the rectangular body 26. Each of the vanes has a generally arcuate shape and a predetermined length depending upon its position relative to a center line "$C_L$" of the radiator 14 as shown in FIG. 3, the curvature of radius of each of the vanes varies dependent upon the cooling effect to be achieved. Furthermore, the length of the vanes can be varied as well. For example, the vane 36' adjacent the center line, $C_L$, of the radiator, is of one length and the lengths of the next adjacent vanes increase so that the vane 36" at the outermost vertical side edge of the radiator is longer than the vane 36'. Conversely, the vane 36' could be the longest vane and the vane 36" at the vertical side edge of the radiator could be the shortest vane. In the preferred embodiment, the vanes most adjacent the center line of the radiator are the longest vanes and a decreasing in length as the vanes head toward the side edge 22 of the radiator.

The vanes can be formed integrally with the generally rectangular body 26 of the cooling duct 24 or may be placed and secured therein after fabrication of the cooling duct 24. Furthermore, each of the vanes has a comb-shaped configuration which increases the stratification and distribution of the air flowing therethrough. As stated above, the overall purpose of the vanes is to direct the ambient air through the radiator to each of the plenums toward which the vanes are curved.

Figure 2:
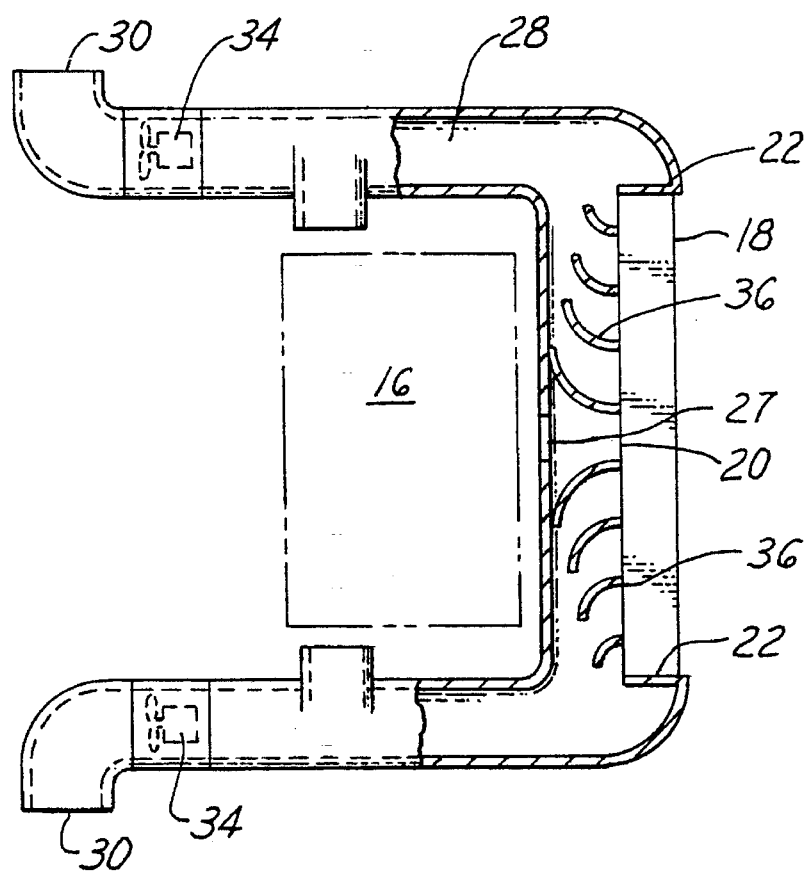
FIG. 2 is a top plan view of the present invention of FIG. 1.
Figure 4:
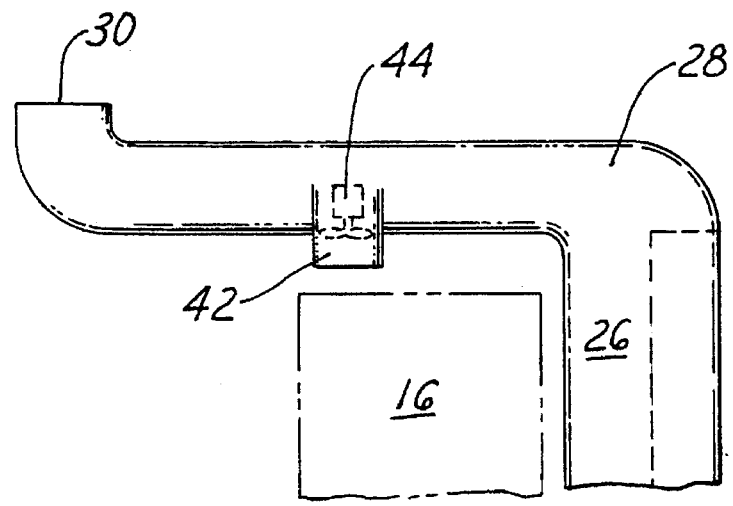
FIG. 4 is an enlarged view of a section of FIG. 2.

FIGS. 2 and 4 show an alternative embodiment of the present invention. In FIGS. 2 and 4, each of the plenums 28 further includes an engine inlet opening 42 disposed adjacent the vehicle engine 16. These openings are disposed within the engine compartment and receive the engine compartment air therethrough. In one embodiment, such as shown in FIG. 4, the engine inlet opening 42 includes an electric motor driven fan 44 disposed therein which operates to draw the engine compartment air through the opening 42 and into plenum 28. The fan 42 can be either in addition to fans 34 or as the only fan within the cooling duct 24. By placing the fan 44 in the proper location in the opening 42, the fan 44 can draw air through the radiator 14 and into plenums 28. By utilizing a fan 44, the engine compartment can be cooled more effectively than is shown in the prior art. As above with fans 34, fan 44 can be attached to a temperature control device such that when the temperature within the engine compartment exceeds a predetermined value, fan 44 would turn on and thus withdrawing some of the hot engine air out to ambient to provide further cooling to the engine 16 of the vehicle.

Various modifications of the present invention will become apparent to those skilled in the art. The terms used in the description of the present invention are merely meant as descriptions and not limitations upon the present invention. Therefore, it is the following claims, including all equivalents, which define the scope of the invention.

What is claimed is:

1. A cooling apparatus for cooling an engine of an automotive vehicle, comprising:

a radiator in fluid communication with the engine and having a coolant flowing therethrough for cooling the engine, said radiator having a front face for receiving ambient air therethrough and a rear face disposed proximate the engine;

a duct assembly for drawing a flow of air into said radiator and directing the flow of air exiting the radiator away from said vehicle engine, said assembly comprising:

a generally rectangular body partially enclosing said radiator and sealably secured thereto, said body including a selectably openable bleed port disposed proximate said vehicle engine for allowing RAM air to pass therethrough;

a pair of generally curvilinear plenums formed integrally with said body, each of said pair in fluid communication with said body and extending longitudinally from said body, each of said plenums including an engine inlet opening disposed proximate said vehicle engine for drawing engine compartment air therein and an exit end for directing air exiting therefrom to ambient air;

a plurality of generally arcuate, comb-shaped vanes disposed in said body immediately adjacent said rear face of radiator, each of said vanes having a predetermined length and a predetermined radius of curvature depending upon its location relative to a centerline of said radiator, wherein the length of each vane decreases from a larger of two predetermined values for a vane adjacent the centerline of said radiator to a smaller of two predetermined values for a vane adjacent the side edge thereof, wherein approximately half of said plurality of vanes is generally curved toward the plenum disposed on a respective side of said radiator, said plurality of vanes being operative to direct the flow of air exiting said radiator;

a fan assembly disposed in each of said engine inlet openings in said plenums for drawing air through said radiator, said body and said pair of plenums and away from said engine compartment.

2. A cooling apparatus according to claim 1, wherein said fan assembly comprises an electric motor driven fan.

3. A cooling apparatus according to claim 1, wherein said body, said plurality of vanes and said pair of plenums are fabricated from a synthetic polymeric material.

\* \* \* \* \*